(12) United States Patent
Fukuda et al.

(10) Patent No.: US 10,913,150 B2
(45) Date of Patent: Feb. 9, 2021

(54) PROCESSING SYSTEM AND METHOD OF CONTROLLING ROBOT

(71) Applicant: Kabushiki Kaisha Yaskawa Denki, Kitakyushu (JP)

(72) Inventors: Takuya Fukuda, Kitakyushu (JP); Yukio Hashiguchi, Kitakyushu (JP); Kenji Matsukuma, Kitakyushu (JP); Makoto Umeno, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 390 days.

(21) Appl. No.: 15/916,281

(22) Filed: Mar. 9, 2018

(65) Prior Publication Data

US 2018/0194004 A1 Jul. 12, 2018

Related U.S. Application Data

(63) Continuation of application No. PCT/JP2015/075891, filed on Sep. 11, 2015.

(51) Int. Cl.
*B25J 9/16* (2006.01)
*B25J 19/02* (2006.01)

(52) U.S. Cl.
CPC .......... *B25J 9/1612* (2013.01); *B25J 9/16* (2013.01); *B25J 9/1694* (2013.01); *B25J 19/022* (2013.01)

(58) Field of Classification Search
CPC . B25J 9/1612; B25J 9/16; B25J 9/1694; B25J 19/022
See application file for complete search history.

(56) References Cited

U.S. PATENT DOCUMENTS

| | | |
|---|---|---|
| 2007/0165321 A1 | 7/2007 | Hashimoto |
| 2008/0228404 A1* | 9/2008 | Garty ............... C40B 60/12 702/19 |
| 2010/0204828 A1 | 8/2010 | Yoshiike et al. |
| 2011/0087360 A1 | 4/2011 | Chen et al. |

(Continued)

FOREIGN PATENT DOCUMENTS

| | | |
|---|---|---|
| CN | 102145490 A | 8/2011 |
| GB | 2515657 A | 12/2014 |

(Continued)

OTHER PUBLICATIONS

English Translation of Written Opinion of the International Searching Authority for PCT/JP2015/075891 accompanied with PCT/IB/373 and PCT/IB/338 dated Mar. 22, 2018, acting as concise explanation of previously submitted reference(s).

(Continued)

*Primary Examiner* — Jeff A Burke
*Assistant Examiner* — Jamal A Shah
(74) *Attorney, Agent, or Firm* — HEA Law PLLC (57) ABSTRACT

A processing system includes a robot including at least one arm each including a hand at an end of the at least one arm; a first position measurement sensor, which is to be grasped by the hand and moved by the at least one arm, and is configured to measure a position of a device to be used when the robot processes a processing target; and a robot control device configured to: cause the hand to grasp the first position measurement sensor; and cause the first position measurement sensor to measure the position of the device.

10 Claims, 7 Drawing Sheets

(56) References Cited

U.S. PATENT DOCUMENTS

| | | | |
|---|---|---|---|
| 2011/0098856 A1 | 4/2011 | Yoshiike et al. | |
| 2014/0046486 A1 | 2/2014 | Mimura et al. | |
| 2014/0067115 A1 | 3/2014 | Minami et al. | |
| 2014/0172167 A1 | 6/2014 | Matsukuma et al. | |
| 2015/0127153 A1 | 5/2015 | Yamaguchi et al. | |
| 2016/0059419 A1* | 3/2016 | Suzuki | B25J 9/1697 700/114 |

FOREIGN PATENT DOCUMENTS

| | | |
|---|---|---|
| JP | S60-128506 A | 7/1985 |
| JP | H05-093749 U | 12/1993 |
| JP | H09-105608 A | 4/1997 |
| JP | H09-319420 A | 12/1997 |
| JP | H11-042579 A | 2/1999 |
| JP | H11-347985 A | 12/1999 |
| JP | 2000-006067 A | 1/2000 |
| JP | 2007-188615 A | 7/2007 |
| JP | 2010-036293 A | 2/2010 |
| JP | 2011-093027 A | 5/2011 |
| JP | 2011-177845 A | 9/2011 |
| JP | 2011-194493 A | 10/2011 |
| JP | 2011-230243 A | 11/2011 |
| JP | 2012-240174 A | 12/2012 |
| JP | 5366018 B2 | 12/2013 |
| JP | 2014-034075 A | 2/2014 |
| JP | 2014-046419 A | 3/2014 |
| JP | 2014-117781 A | 6/2014 |
| JP | 5549223 B2 | 7/2014 |
| JP | 2015-006721 A | 1/2015 |
| JP | 2015-085481 A | 5/2015 |
| JP | 2015-089575 A | 5/2015 |
| WO | 2009/017242 A2 | 2/2009 |

OTHER PUBLICATIONS

Office Action dated Sep. 4, 2018, for relating JP Patent Application No. 2017-536088 and English translation thereof.

Office Action for Japanese Patent Application No. 2017-538828 dated Sep. 25, 2018, acting as concise explanation of previously submitted reference(s) on Mar. 9, 2018.

Office Action dated Jan. 15, 2019, for corresponding JP Patent Application No. 2017-536088 and English translation thereof.

English Translation of Written Opinion of the International Searching Authority for PCT/JP2015/073634 accompanied with PCT/IB/373 and PCT/IB/338 dated Mar. 8, 2018, acting as concise explanation of previously submitted reference(s).

Office Action dated Feb. 5, 2019, for corresponding JP Patent Application No. 2017-538828 and English translation thereof.

The International Search Report of PCT/JP2015/075891 and English translation thereof.

The International Search Report of related application PCT/JP2015/073634 English translation thereof.

* cited by examiner

PROCESSING SYSTEM AND METHOD OF CONTROLLING ROBOT

CROSS-REFERENCE TO RELATED APPLICATION

The present application is continuation of International Application No. PCT/JP2015/075891 filed on Sep. 11, 2015. The content of this application is hereby incorporated by reference into this application.

BACKGROUND OF THE INVENTION

1. Field of the Invention

The present invention relates to a processing system and a method of controlling a robot.

2. Description of the Related Art

Hitherto, there have been cases in which a position of an object is measured in order to reliably grasp the object by a robot arm. For example, in Japanese Patent Application Laid-open No. Hei 9-105608, there is described a measurement system configured to measure a height position, a two-dimensional position, and a posture of a piece of baggage with a laser marker and a CCD camera mounted on a hand of a robot, and cause the hand to pick up the piece of baggage.

Further, in Japanese Patent No. 5366018, there is described a scanning operation for measuring one or more edge positions of respective sides of a work object with a position detection sensor mounted on a robot. Further, in Japanese Patent No. 5549223, there is described a touch position detection probe mounted on a robot, which is configured to measure three points (P1, P2, P3) on two perpendicular sides of a work object.

One or more embodiment of the present invention has an object to provide a processing system and a method of controlling a robot, which are capable of accurately positioning a tool grasped by a robot arm when the robot arm grasps the tool to perform some work.

SUMMARY OF THE INVENTION

According to one embodiment of the present invention, there is provided a processing system including: a robot including at least one arm each including a hand at an end of the at least one arm; a first position measurement sensor, which is to be grasped by the hand and moved by the at least one arm, and is configured to measure a position of a device to be used when the robot processes a processing target; and a robot control device configured to: cause the hand to grasp the first position measurement sensor; and cause the first position measurement sensor to measure the position of the device.

Further, in the processing system according to another embodiment of the present invention, the first position measurement sensor may include a laser sensor, and the robot control device may be configured to cause the hand to grasp the laser sensor so that a central axis of a tool, which is used for processing of the processing target, at a time when the tool is grasped by the hand, and an optical axis of laser light of the laser sensor overlap with each other.

Further, in the processing system according to another embodiment of the present invention, when the robot control device causes the first position measurement sensor to measure the position of the device, the robot control device may cause the hand to grasp the first position measurement sensor so that a direction crossing a longitudinal direction of the hand falls within a measurement range of the first position measurement sensor.

Further, in the processing system according to another embodiment of the present invention, the processing system may further include a position reference instrument, which is fixed at a predetermined position, and the robot control device may include a compensation unit configured to cause the first position measurement sensor to measure a position of the position reference instrument before measuring the position of the device with the hand grasping the first position measurement sensor, to compensate for deviation of a position at which the first position measurement sensor is grasped.

Further, in the processing system according to another embodiment of the present invention, the first position measurement sensor may include a plurality of handles to be grasped by the hand, and the robot control device may include a selection unit configured to select one of the plurality of handles of the first position measurement sensor to be grasped depending on processing of the processing target using the device.

Further, in the processing system according to another embodiment of the present invention, the plurality of handles may be provided so as to extend in different directions, and the robot control device may be configured to set an angle of the hand to an angle corresponding to one of the directions in which the plurality of handles are provided, to cause the hand to grasp any one of the plurality of handles.

Further, in the processing system according to another embodiment of the present invention, the processing system may further include a second position measurement sensor included in the robot, and the robot control device may be configured to cause the robot to perform processing of the processing target using the device based on the position of one of the device and the processing target measured by the second position measurement sensor.

Further, according to another embodiment of the present invention, there is provided a method of controlling a robot, the method including: grasping, by a robot including at least one arm including a hand at an end of the at least one arm, a first position measurement sensor by the hand; moving, by the arm, the first position measurement sensor grasped by the hand; and measuring a position of a device to be used when the robot processes a processing target.

DESCRIPTION OF THE EMBODIMENTS

Figure 1:
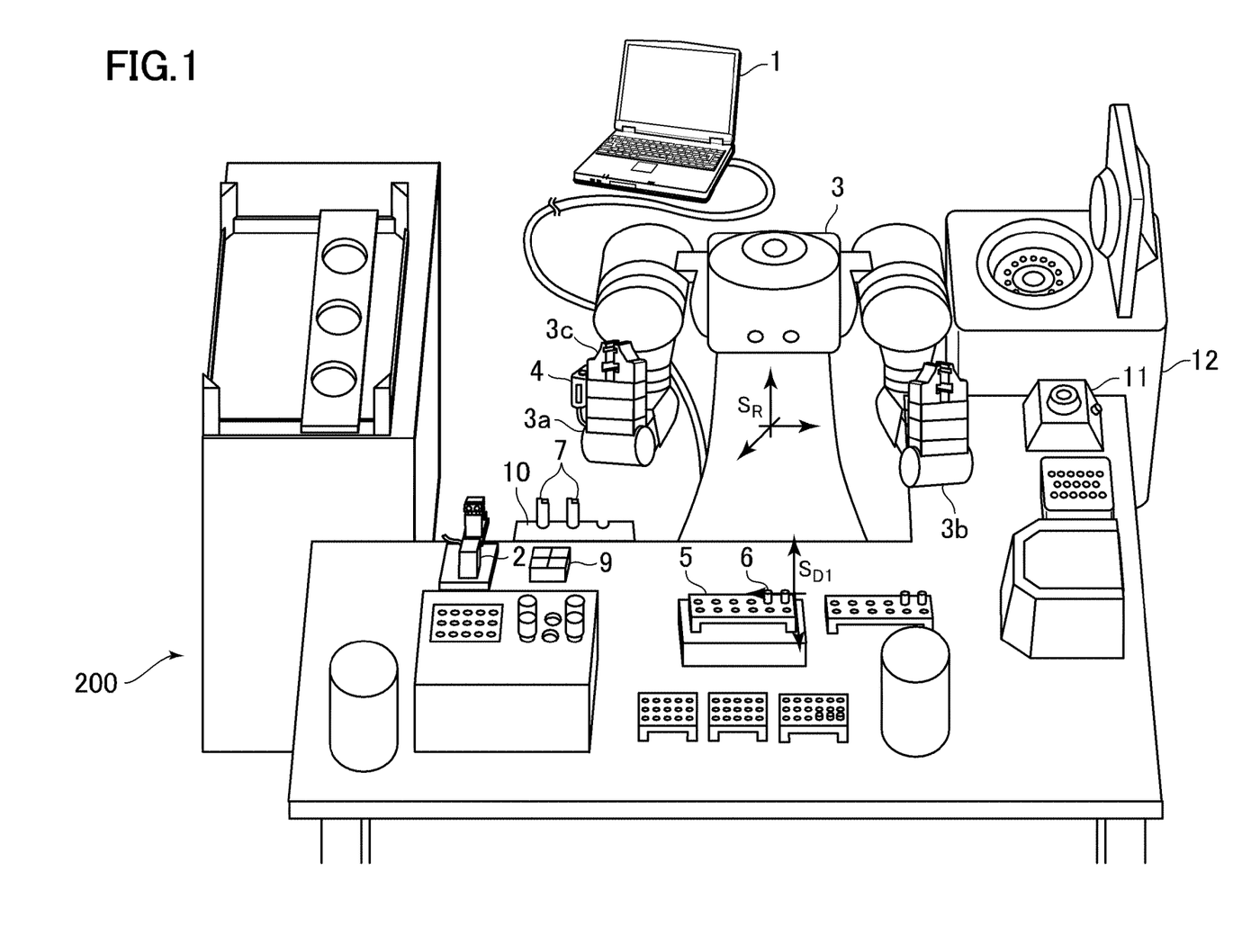
FIG. 1 is a schematic diagram for illustrating a physical configuration of a processing system according to an embodiment of the present invention.

FIG. 1 is a schematic diagram for illustrating a physical configuration of a processing system 200 according to an embodiment of the present invention. The processing system 200 also includes at least a robot control device 1 configured to control a robot 3. The robot control device 1 itself may be a dedicated device. However, in this case, the robot control device 1 is implemented by using a common computer. In other words, a commercially-available computer configured to execute a computer program for causing the computer to operate as the robot control device 1 is used for the robot control device 1. The computer program is in general provided in the form of application software, and is used when installed on the computer. The application software may be provided by recording the application software on a compact disc read-only memory (CD-ROM), a digital versatile disc (DVD) ROM, or other suitable computer-readable information recording media. Further, the application software may be provided over various information communication networks, for example, the Internet. In addition, the functions of the application software may be provided by a server at a remote location over an information communication network, that is, may be implemented by so-called cloud computing.

The processing system 200 includes the robot 3, which includes at least one arm each including a hand 3c at its end. The robot 3 is a multi-joint robot and, in this embodiment, a two-arm robot having a first arm 3a and a second arm 3b. The robot 3 performs processing on at processing target, by using each arm independently or moving both arms in a cooperative manner. The first arm 3a and the second arm 3b are specifically arms each having seven or more joints and capable of performing processing on a processing target at a plurality of different postures. The postures of the arms are described in detail later. A processing target in this embodiment is an object on which a series of tests, cultivation, amplification, or other types of processing in the fields of biochemistry and biotechnology is performed, for example, cultivated cells or a reagent. Processing targets other than the ones given above may be used, and may be machined or assembled/disassembled parts that are welded, fastened with a bolt, or otherwise processed by the robot 3, or goods to be carried for conveyance, palletizing, or other purposes.

Objects to be operated by the arms are not particularly limited. The robot 3 in this embodiment, however, uses the hand 3c installed at the end of the first arm 3a mainly to operate an illustrated or unillustrated laboratory instrument, for example, to grip and operate one of pipettes 7 housed in a pipette rack 10. The robot 3 uses the hand installed at the end of the second arm 3b to move various illustrated or unillustrated containers, for example, to grip a microtube 6 housed in a tube rack 5 and move the microtube 6 from the tube rack 5 to a vortex mixer 11, a centrifuge 12, or other destinations.

The processing system 200 includes a first position measurement sensor 2, which is grasped by the hand 3c and moved by the first arm 3a, and is configured to measure a position of a device to be used when the robot 3 processes a processing target. The first position measurement sensor 2 is a sensor for identifying a position of a measurement target relative to as arm of the robot 3. The first position measurement sensor 2 can detect a two-dimensional or three-dimensional position of the measurement target on its own or along with an action of the arm. In this embodiment, the first position measurement sensor 2 is a laser sensor, which is a sensor configured to radiate laser light to the measurement target to measure a distance to the measurement target. The first position measurement sensor 2 may not be a laser sensor, and for example, a camera capable of capturing a moving image or a still image to detect a position, an ultrasonic sensor, a touch sensor, or a magnetic sensor may be employed. In this embodiment, a laser sensor may be employed as the first position measurement sensor 2 to accurately measure a distance to the measurement target in a non-contact manner. In the example illustrated in FIG. 1, the processing system 200 includes a position reference instrument 9. The position reference instrument 9 is described in detail later.

The processing system 200 includes a second position measurement sensor 4, which is included in the robot 3. Similarly to the first position measurement sensor 2, the second position measurement sensor 4 is a sensor for identifying the position of the measurement target relative to the arm of the robot 3. In this embodiment, the second position measurement sensor 4 is a laser sensor, which is a sensor configured to radiate laser light to the measurement target to measure the distance to the measurement target. Similarly to the case, of the first position measurement sensor 2, the second position measurement sensor 4 may not foe a laser sensor, but may be, for example, a camera.

In the example of FIG. 1, the processing system 200 includes the vortex mixer 11, the centrifuge 12, and the like, which are examples of an instrument used in an experiment. Other types of instruments may be included in addition to, or in place of, the ones given as examples. For instance, the processing system 200 may include a rack configured to store petri dishes, and a magnet rack. While the robot 3 in this embodiment is a two-arm robot and include the first arm 3a and the second arm 3b, the at least one arm included in the processing system 200 may be, for example, installed separately and independently as a plurality of arms and controlled by the robot control device 1 so as to act in cooperation with one another.

The processing system 200 according to this embodiment uses a plurality of coordinate systems to define, for example, a point P in a space to be approached by the hand 3c provided at the end of the arm of the robot 3. One of the coordinate systems is a robot coordinate system $S_R$ accompanying the robot 3. The robot coordinate system $S_R$ is a coordinate system with the robot 3 serving as a reference, which is a left-handed orthogonal coordinate system with its origin being the center of the robot 3 in this example. A point in the robot coordinate system $S_R$ is represented by coordinates (X, Y, Z) with the robot 3 serving as the reference. The coordinates of the end of the arm of the robot 3 can be represented by using at least the robot coordinate system $S_R$. The coordinates (X, Y, Z) of the point P represented by the robot coordinate system $S_R$ correspond to angles ($\theta_1$, $\theta_2$, ..., $\theta_N$) of a plurality of joints (N joints) constructing the arm. In the present application, the angles ($\theta_1$, $\theta_2$, ..., $\theta_N$) of a plurality of joints forming the arm are referred to as the posture of the arm. When the degree of freedom (number of joints) of the arm is equal to or larger than 7, the angles ($\theta_1$, $\theta_2$, ..., $\theta_N$) of joints of the arm are not uniquely determined at the time of the hand 3c approaching the point P from a desired direction, which means that there is a redundancy. The origin of the robot coordinate system $S_R$ may be set to a point other than the center of the robot, and the type of a coordinate system to be used may be the one other than the orthogonal coordinate system.

In the processing system 200 according to this embodiment, a device coordinate system $S_D$ accompanying a device, for example, the tube rack 5, which is used when the robot 3 processes a processing target, is also used. For example, a device coordinate system $S_{D1}$ accompanying the tube rack 5 is a left-handed orthogonal coordinate system with its origin being a corner of an upper part of the tube rack 5, and coordinates (x1, y1, z1) in the device coordinate system $S_{D1}$ represent the point P with the tube rack 5 serving as the reference. The device coordinate system $S_{D1}$ can be used to represent a storage position of the microtube 6 stored in the tube rack 5 in a simplified manner. Further, the device coordinate system $S_D$ can be used to set a coordinate system (e.g., spherical coordinates or cylindrical coordinates) for each device, which is appropriate for the device. Further, even, when a position at which a device is mounted on a workbench is changed, the position of the hand 3c in the processing is not changed when being represented by the device coordinate system which means that there is an advantage of easily transforming the posture $(\theta_1, \eta_2, \ldots, \theta_N)$ of the arm. The device coordinate system $S_D$ may be configured and stored in advance by a simulator executed by the robot control device 1 or an external computer.

When the processing system 200 causes the robot 3 to perform an experiment in the fields of biochemistry and biotechnology, details of the experiment, may change in various ways. There are requests for changing devices to be used or changing arrangement of devices for each experiment. However, for example, in processing using the pipette 7, a tip mounted on the end of the pipette 7 is aligned with an interior wall of the microtube 6 to inject a chemical liquid or to suck a minute amount of supernatant liquid stored in the microtube 6. That is, precise work or accurate control of the arm may be required. In such a case, even when the device coordinate system $S_D$ is configured by a simulator, influences of, for example, a backlash of gears constructing each joint of the arm or bending of the arm may cause deviation of a point to be actually approached by the arm. Thus, in order to conduct precise work, it is desired that the device coordinate system $S_D$ be configured in consideration of influences of, for example, bending of the arm.

The robot control device 1 in this embodiment causes the hand 3c to grasp the first position measurement sensor 2, and causes the first position measurement sensor 2 to measure the position of the device. With this, a difference between the posture of the arm in the processing of a processing target and the posture of the arms in measurement of the position of the device by the first position measurement sensor 2 becomes smaller. In this context, the small difference between postures of the arm means that a norm $|\theta_{processing}-\theta_{measurement}|$ of a difference vector $(\theta_{processing}-\theta_{measurement})$ between an N-dimensional vector $\theta_{processing}$ representing the posture of the arm in the processing and an K-dimensional vector $\theta_{measurement}$ representing the posture of the arm in the measurement is small. The norm $|\theta_{processing}-\theta_{measurement}|$ of the vector difference may be defined in any manner as long as the difference in posture of the arm can be evaluated. For example, the norm may be calculated by the total sum of absolute values of respective elements, for example, $|(a_1, a_2, \ldots, a_N)|=|a_1|+|a_2|+\ldots+|a_N|$. Further, the magnitude of an influence of each joint on the posture of the arm differs depending on each joint, and thus the influence of each joint may be weighted for each vector element representing an angle of each joint, to thereby evaluate the norm of the vector difference. The small norm $|\theta_{processing}-\theta_{measurement}|$ of the vector difference means that the value of the norm falls within the lowest 25% of values to be taken by the norm. In other words, the small norm $|\theta_{processing}-\theta_{measurement}|$ of the vector difference means that, when the minimum to maximum values of the norm $|\theta_{processing}-\theta_{measurement}|$ of the vector difference are divided into four numerical sections, the value of the norm falls within a section containing the minimum value. The norm of the difference of the posture of the arm may not be used but other evaluation functions may be used in order to evaluate the magnitude of the difference in posture of the arm.

With the robot control device 1 in this embodiment, the first position measurement sensor 2 can measure the position of the device in a posture close to that of the arm in a case of causing the arm to perform processing by grasping a tool, for example, the pipette 7, and deviation of a point to be approached by the hand 3c, which is caused by influences of, for example, a backlash of gears constructing each joint of the arm or bending of the arm, is prevented. Therefore, it is possible to accurately position a tool grasped by the hand 3c when the hand 3c is caused to grasp the tool to perform some work.

Further, the robot control device 1 in this embodiment calibrates a relationship between the device coordinate system $S_D$ and the robot coordinate system $S_R$. In this context, the relationship between the device coordinate system $S_D$ and the robot coordinate system $S_R$ is a relationship between the position of the processing target relative to the device and the position of the arm. Specifically, the relationship refers to a transform matrix A for transforming coordinates (x, y, z) of the point P represented by the device coordinate system $S_D$ into the coordinates (x, y, z) of the point P represented by the robot, coordinate system $S_R$. The transform matrix A is generally a 3×3 matrix of six degrees of freedom representing translation and rotation. The processing system 200 in this embodiment accurately constructs the device coordinate system $S_D$, and calibrates the relationship between the device coordinate system. $S_D$ and the robot coordinate system $S_R$, namely, the transform matrix A, to thereby enable precise work by the arm.

Figure 2:
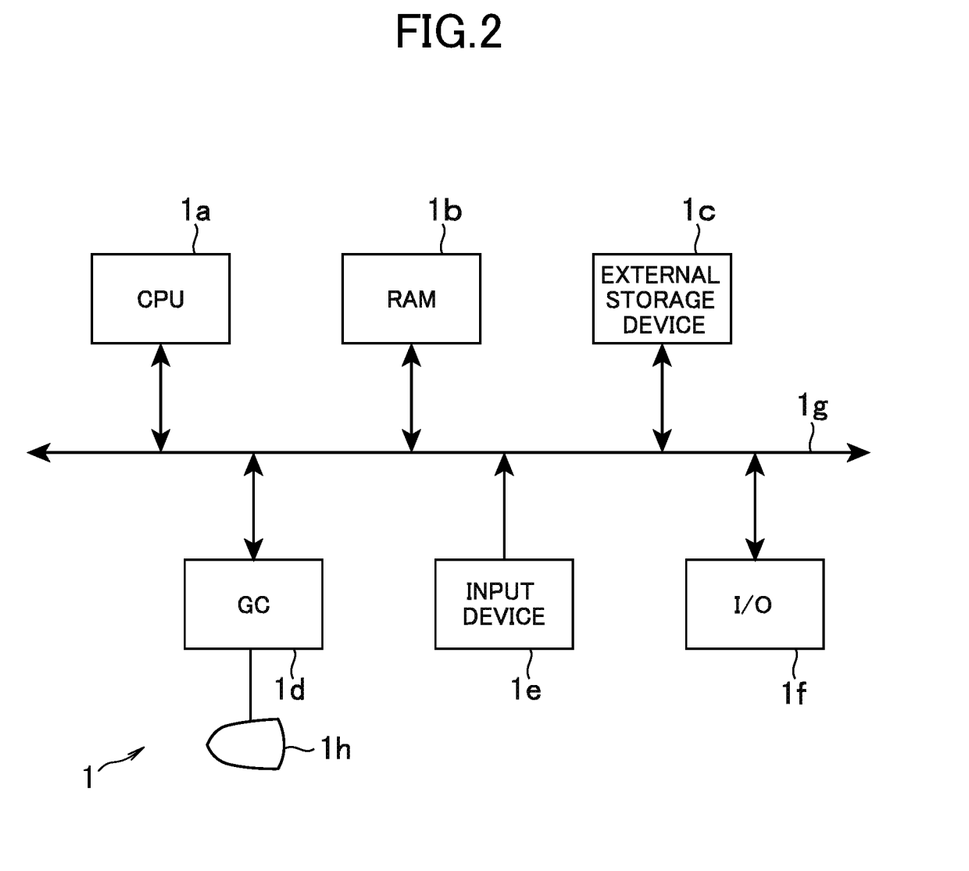
FIG. 2 is a block diagram for illustrating a physical configuration of a robot control device in the embodiment of the present invention.

FIG. 2 is a block diagram for illustrating a physical configuration of the robot control device 1 in the embodiment of the present invention. The configuration illustrated in FIG. 2 is a general computer to be used as the robot control device 1. In the computer, a central processing unit (CPU) 1a, a random access memory (RAM) 1b, an external storage device 1c, a graphics controller (GC) 1d, an input device 1e, and an input/output (I/O) 1f are connected to one another by a data bus 1g so that the devices can exchange electric signals therebetween. In this case, the external storage device 1c is a device capable of statically recording information, for example, a hard disk drive (HDD) or a solid state drive (SSD). Further, signals from the GC 1d are output and displayed as an image on a monitor 1h, for example, a flat panel display, which allows a user to visually recognize the image. The input device 1e is a device, for example, a keyboard, a mouse, or a touch panel, which allows the user to input information. The I/O 1f is an interface that allows the robot control device 1 to exchange information with an external device.

Figure 3:
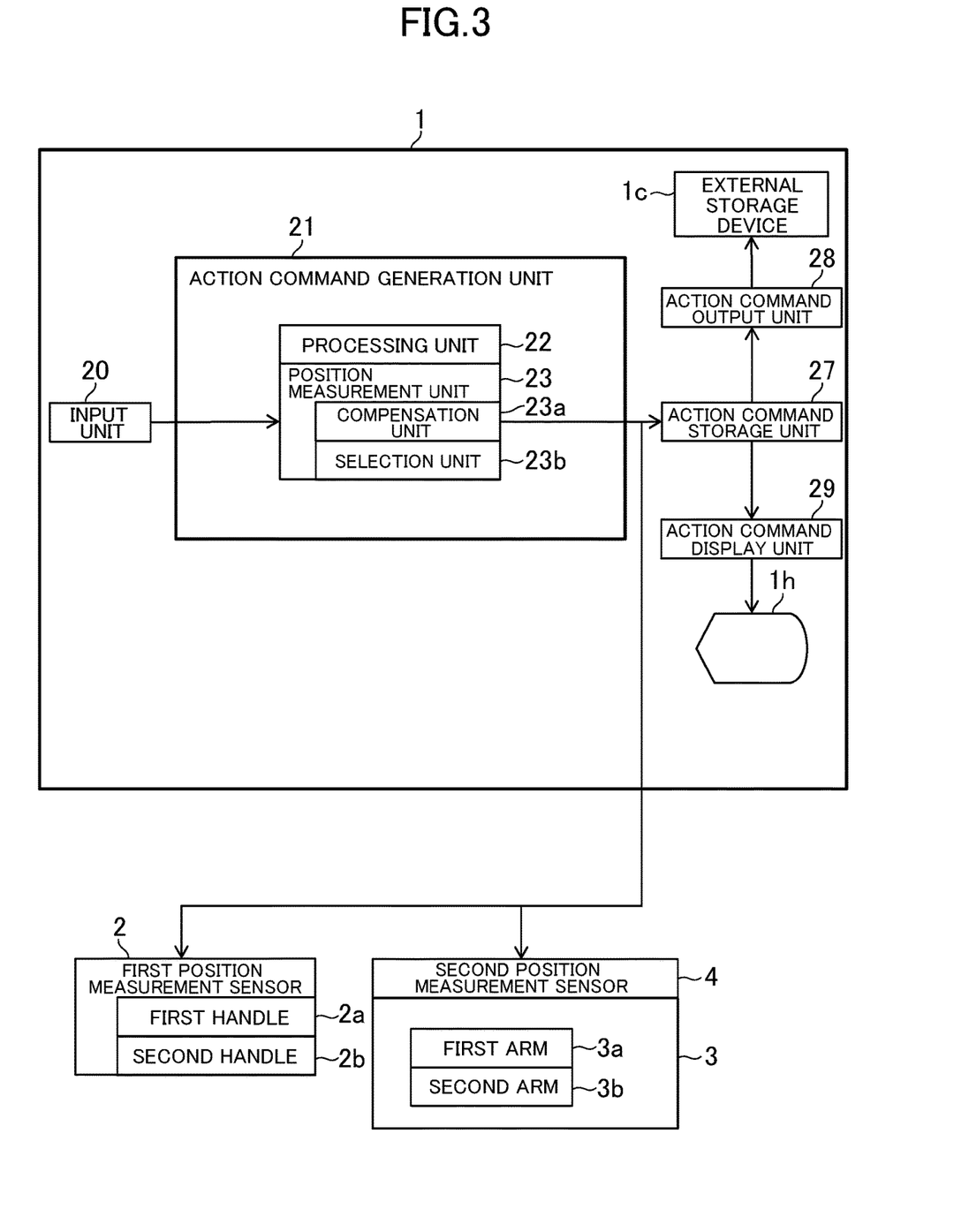
FIG. 3 is a functional block diagram for illustrating the robot control device, a first position measurement sensor, a second position measurement sensor, and a robot in the embodiment of the present invention.

FIG. 3 is a functional block diagram for illustrating the robot control device 1, the first position measurement sensor 2, the second position measurement sensor 4, and the robot 3 in the embodiment of the present invention. The function blocks illustrated in FIG. 3 focus on the functions of the robot control device 1 and the like, and there does not always exist physical components corresponding to the respective function blocks on a one-to-one basis. Some function-blocks may be implemented by an information processing device, for example, the CPU 1a of the robot control device 1f executing specific software. Further, some function blocks may foe implemented by a specific storage area being allocated to an information storage device, for example, the RAM 1b of the robot control device 1.

The robot control device 1 includes an input unit 20 configured to receive various inputs from the user. The robot control device 1 also includes an action command generation unit 21 configured to generate an action command that is a command to control the action of the robot 3, based on an input received by the input unit 20. Further, the robot control device 1 includes an action command storage unit 27 configured to store electronic data of an action command that is being generated and an action command that has been generated, an action command output unit 28 configured to output a generated action command as an electronic file in a format that can be read by the robot 3, and an action command display unit 29 configured to format electronic data of an action command that is stored in the action command storage unit 21, and to display the data on the monitor 1h.

The input unit 20 is normally configured by the input device 1e illustrated in FIG. 2. However, when the robot control device 1 is an application server used in cloud computing, the I/O 1f into which operation information input by the user on a terminal at a remote location is input corresponds to the input unit 20.

The action command generation unit 21 includes various functional blocks for generating an action command. Although details of the action command generation unit 21 are described later together with descriptions of a procedure of generating an action command, the action command generation unit 21 in this embodiment includes a processing unit 22 configured to move an arm relative to the measured position of the device and causes the arm to process the processing target, and a position measurement unit 23 configured to cause the hand 3c to grasp the first position measurement sensor 2 and cause the first position measurement sensor 2 to measure the position of the device. Further, the position measurement unit 23 includes a compensation unit 23a configured to cause the first position measurement sensor 2 to measure the position of the position reference instrument 9 before measuring the position of the device with the hand 3c grasping the first position measurement sensor 2, to compensate for deviation of a position at which the first position measurement sensor 2 is grasped, and a selection unit 23b configured to select one of a plurality of handles of the first position measurement sensor 2 to be grasped depending on processing of a processing target using the device.

In the present application, the term "action command" refers to a command that is a single job or a collection of jobs in which a plurality of jobs have been combined, and is a command for instructing processing that is recognized as a single unit to foe performed on the processing target or the container in which the processing target is stored.

Further, in the processing system 200 according to this embodiment, a device to be used at the time of the robot 3 processing a processing target is the tube rack 5, the microtube 6, the pipette 7, the vortex mixer 11, or the centrifuge 12. Those devices are only examples, and it is to be understood that other de vices may be included in general. Any device included in the processing system 200 may be the device to be used at the time of the robot 3 processing the processing target.

Figure 4:
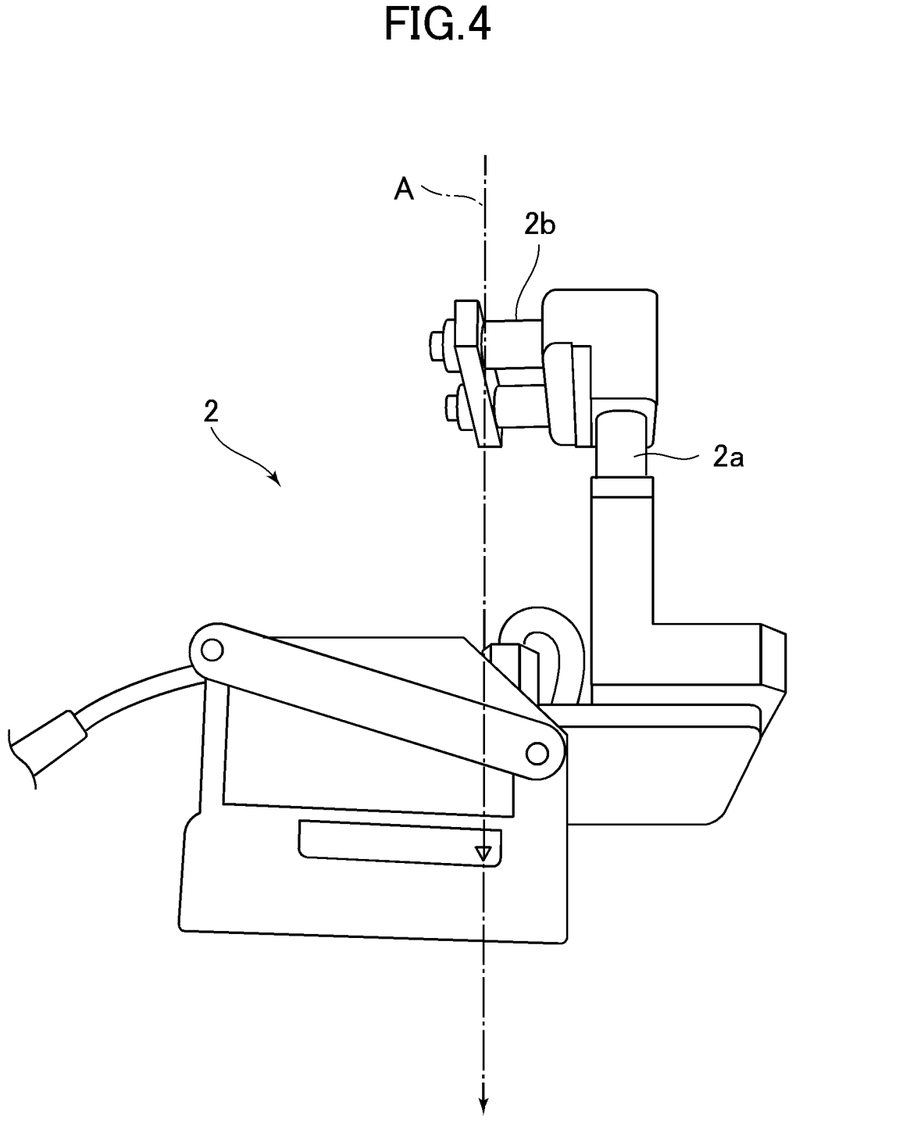
FIG. 4 is a diagram for illustrating an external view of the first position measurement sensor in the embodiment of the present invention.

FIG. 4 is a diagram for illustrating an external view of the first position measurement sensor 2 in the embodiment of the present invention. The first position measurement sensor 2 in this embodiment is a laser sensor, and includes a plurality of handles to be grasped by the hand 3c. The first position measurement sensor 2 of the example illustrated in FIG. 4 includes a first handle 2a and a second handle 2b. Further, in FIG. 4, an optical axis A of laser light emitted by the first position measurement sensor 2 is illustrated so that the optical axis A is elongated to penetrate the first position measurement sensor 2.

The first position measurement sensor 2 serving as a laser sensor is grasped by the hand 3c, moved by the first arm 3a, and used for measurement, of the position of the device, for example, the tube rack 5. The laser light of the laser sensor is radiated from above toward the device, for example, the tube rack 5, and is caused to scan the device from the inner side thereof toward the outer side. When the laser light crosses the edge of the device, the distance measured by the laser sensor becomes discontinuous. The position measurement unit 23 acquires the posture (angle of each joint) of the arm at the time when the laser light crosses the edge of the device and the distance becomes discontinuous, and the distance to the device measured by the laser sensor. A two-dimensional position of the side edge represented by the robot coordinates can be calculated from the posture of the arm at the time when the laser light crosses the side edge, and a three-dimensional position of the side edge can be acquired in consideration of the distance measured by the laser sensor. The position measurement unit 23 measures the positions of edges at a plurality of points for two sides of the device that extend in directions crossing each other in a plan view, and configures the device coordinate system $S_D$ based on those measurement points.

Figure 5:
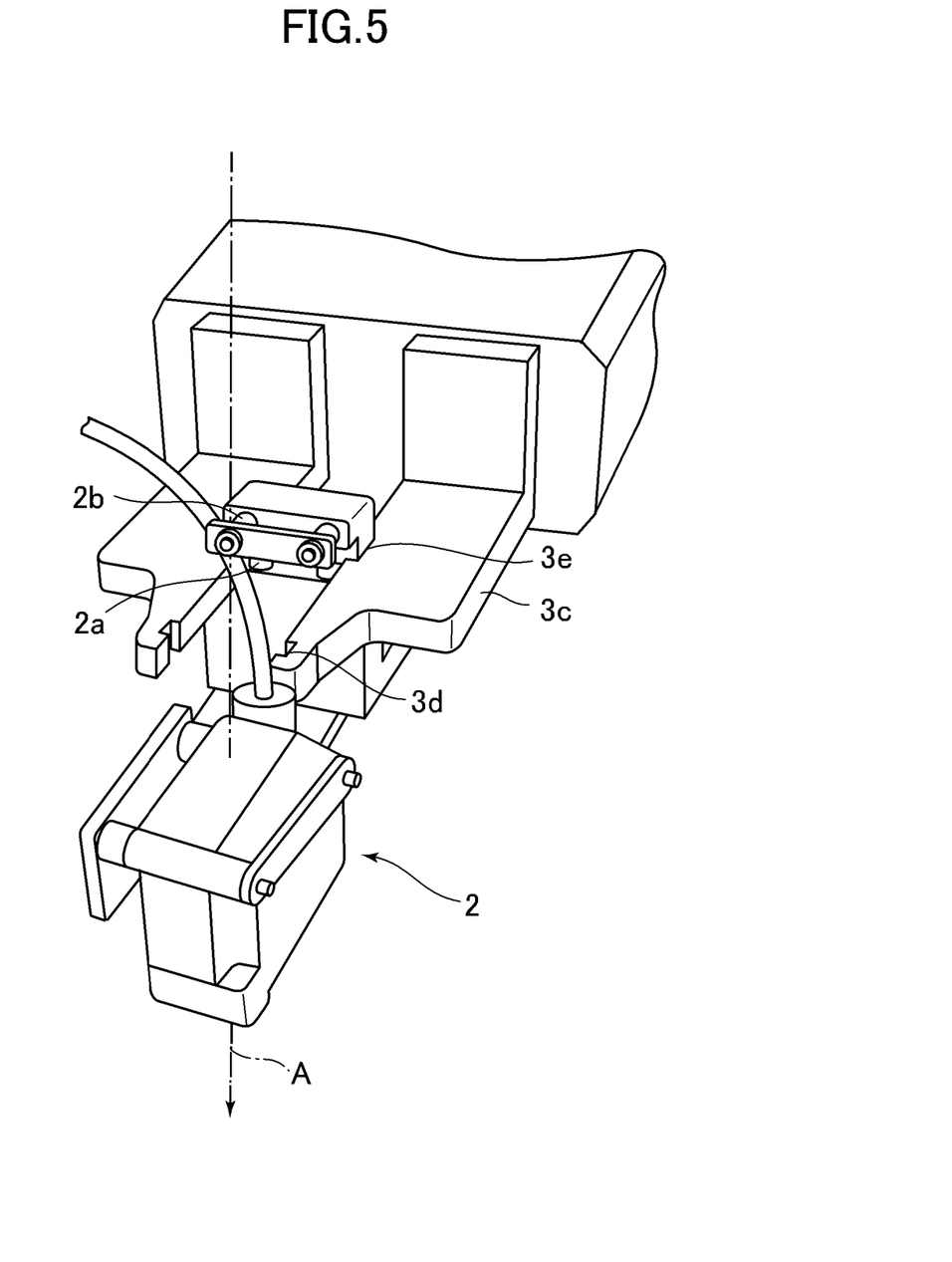
FIG. 5 is a diagram for illustrating a grasp action of a first handle of the first position measurement sensor by a hand of the robot in the embodiment of the present invention.

FIG. 5 is a diagram for illustrating a grasp action of the first handle 2a of the first position measurement sensor 2 by the hand 3c of the robot 3 in the embodiment of the present invention. In the example illustrated in FIG. 5, the hand 3c includes a first grasp portion 3d, which is a recessed portion provided at the end of the hand 3c. The first grasp portion 3d is used when a relatively thin tool, for example, the pipette 7, is grasped. Further, the hand 3c includes a second grasp portion 3e, which is a recessed portion provided at the root of the hand 3c. The second grasp portion 3e is used when a relatively thick tool such as the first handle 2a and the second handle 2b of the first position measurement sensor 2 is used. In FIG. 5, the optical axis A of the laser light emitted by the first position measurement sensor 2 serving as a laser sensor is illustrated.

The robot control device 1 in this embodiment causes the hand 3c to grasp the laser sensor so that the central axis of a tool, which is used for processing of the processing target, at the time when the tool is grasped by the hand 3c and the optical axis A of laser light of the laser sensor overlap with each other. The robot control device 1 in this embodiment causes the second grasp portion 3e of the hand 3c to grasp the first handle 2a of the first position measurement sensor 2 and causes the first grasp portion 3e of the hand 3c to grasp the tool, for example, the pipette 7. The robot control device 1 causes the position at which the hand 3 grasps the first position measurement sensor 2 to differ from the position at which the hand 3 grasps the tool so that the optical axis A and the central axis of the tool overlap with each other. The central axis of the tool herein does not necessarily mean a rotationally symmetric axis. The central axis of the tool is an axis along a longitudinal direction of the tool, which passes through a point at which the tool and the processing target touch with each other.

When the distance between the first grasp portion 3d and the second grasp portion 3e of the hand 3c is represented by L, the first handle 2a of the first position measurement sensor 2 in this embodiment is provided so that the distance between the first handle 2a and the optical axis A of the laser light is L. As a result, the central axis of the tool at the time when the hand 3c grasps the tool and the optical axis A of the laser light of the laser sensor overlap with each other by causing the second grasp portion 3e to grasp the first position measurement sensor 2 and the first grasp portion 3d to grasp a tool, for example, the pipette 7. Instead, the position of grasp by the hand 3c may be controlled so that the central axis of the tool at the time when the hand 3c grasps the tool and the optical axis A of the laser light of the laser sensor overlap with each other by causing the hand 3c, which does not have a recessed portion unlike the first grasp portion 3d and the second grasp portion 3e, to grasp the tool and the laser sensor.

With the robot control device 1 in this embodiment, the measurement point at the time when the hand 3c grasps the first position measurement sensor 2 and the working point by the tool at the time when the hand 3c grasps the tool (point at which the tool and the processing target touch with each other) are close to each other, and the difference in arm posture between the case where the first position measurement sensor 2 is grasped and the case where the tool is grasped becomes smaller. Therefore, it is possible to measure the position and position the tool grasped by the arm more accurately.

When the robot control device 1 in this embodiment causes the first position measurement sensor 2 to measure the position of the device, the robot control device 1 causes the hand 3c to grasp the first position measurement sensor 2 so that a direction crossing the longitudinal direction of the hand 3c falls within a measurement range of the first position measurement sensor 2. The robot control device 1 in this embodiment causes, the hand 3c to grasp the first position measurement sensor 2 so that the optical axis A of the laser light of the laser sensor, which is the first position measurement sensor 2, faces downward with the longitudinal direction of the hand 3c being set to a horizontal direction. With this, the vertical downward direction crossing the longitudinal direction of the hand 3c falls within the measurement range of the laser sensor.

With the robot control device 1 in this embodiment, when the hand 3c grasps the first position measurement sensor 2 with the arm in a horizontally extended posture, the measurement range of the first position measurement sensor 2 is obtained in a downward direction. Therefore, it is possible to perform measurement by the first position measurement sensor 2 with the arm in a fully extended posture so that a measurable range can be widened compared to the case where the hand 3c grasps the first position measurement sensor 2 for measurement with the arm in a bent posture.

Figure 6:
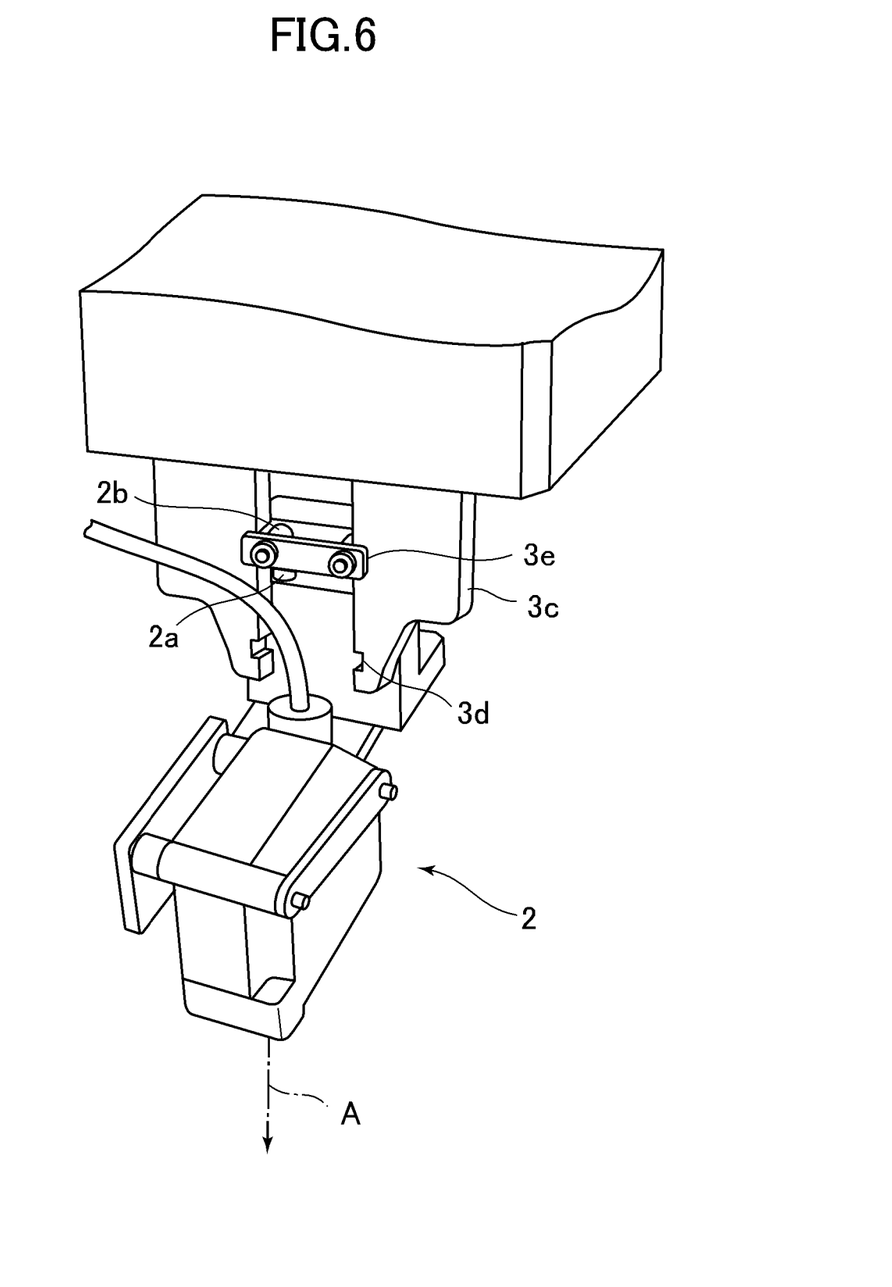
FIG. 6 is a diagram for illustrating a grasp action of a second handle of the first position measurement sensor by the hand of the robot in the embodiment of the present invention.

FIG. 6 is a diagram for illustrating a grasp action of the second handle 2b of the first position measurement sensor 2 by the hand 3c of the robot 3 in the embodiment of the present invention. The second handle 2b is grasped by the second grasp portion 3e of the hand 3c. In FIG. 6, the optical axis A of the laser light emitted by the first position measurement sensor 2 serving as a laser sensor is illustrated.

The first handle 2a and the second handle 2b included in the first position measurement sensor 2 are provided so as to extend in different directions. That is, the first handle 2a extends in a direction parallel to the optical axis A, whereas the second handle 2b extends in a direction orthogonal to the optical axis A. The position measurement unit 23 of the robot control device 1 in this embodiment sets an angle of the hand 3a to an angle corresponding to one of the directions in which the plurality of handles are provided, to cause the hand 3c to grasp any one of the plurality of handles. When the robot control device 1 in this embodiment causes the hand 3c to grasp the first handle 2a, the robot control device 1 sets the angle of the hand 3c to an angle of the longitudinal direction of the hand 3c being orthogonal to the optical axis A, to cause the hand 3c to grasp the first handle 2a. Further, when the robot control device 1 in this embodiment causes the hand 3c to grasp the second handle 2b, the robot control device 1 sets an angle of the hand 3c to an angle of the longitudinal direction of the hand 3c being horizontal to the optical axis A, to cause the hand 3c to grasp the second handle 2b. As a result, it is possible to decrease the difference in arm posture between the case where a tool to be grasped by the hand 3c in a horizontal posture, for example, the pipette 7, is grasped to perform processing using the tool and the case where the first handle 2a of the first position measurement sensor 2 is grasped to measure the position of the device. Further, it is possible to decrease the difference in arm posture between the case where a tool to be grasped by the hand 3c in a vertical posture, for example, the microtube 6, is grasped to perform processing using the tool and the case where the second handle 2b of the first position measurement sensor 2 is grasped to measure the position of the device.

With the position measurement unit 23 in this embodiment, it is possible to cause the hand 3c, to grasp the first measurement sensor 2 so that the angle of the hand 3c in the processing is reproduced, and to decrease the difference in arm posture between the case where the position of the device is measured and the case where the processing is performed. Therefore, it is possible to measure the position and position the tool grasped by the arm more accurately.

The selection unit 23b of the robot control device 1 in this embodiment selects one of a plurality of handles of the first position measurement sensor 2 to be grasped depending on processing of the processing target using the device. The selection unit 23b determines whether or not the hand 3c is horizontal in processing of the processing target using the device. When the hand 3c is horizontal in the processing, the selection unit 23b selects to grasp the first handle 2a of the first position measurement sensor 2. Further, when the hand 3c is vertical in the processing, the selection unit 23b selects the second handle 2b of the first position measurement sensor 2 as the handle to be grasped. When the first position measurement sensor 2 does not have a handle capable of being grasped by the hand 3c without changing the angle of the hand 3c at the time of processing and measurement, the selection unit 23b selects a handle capable of being grasped by the hand 3c with the least change of the angle of the hand 3c at the time of processing and measurement.

With the selection unit 23b in this embodiment, it is possible to cause the hand 3c to grasp the first position measurement sensor 2 and measure the position of the device so that the posture of the arm at the time of processing using the device is reproduced more accurately. Therefore, it is possible to decrease the difference in arm posture between the case where the position of the device is measured and the case where the processing is performed using the device, and to position the tool grasped by the arm more accurately.

In this embodiment, the first handle 2a and the second handle 2b are provided so as to extend in a direction parallel to or orthogonal to the optical axis A, but the handle of the first position measurement sensor 2 may be provided so as to extend in a direction other than those described above, or may be provided in a bent shape. However, the hand 3c is controlled horizontally or vertically in many cases when the tool is grasped, and the fact that the first position measurement sensor 2 has a hand capable of being grasped horizontally or vertically enables the direction of the hand 3c to be the same both at the time of processing by the tool and at the time of measurement by the first position measurement sensor 2. When, for example, there is a tool grasped by the hand 3c with the direction thereof other than the horizontal direction or the vertical direction, it is possible to decrease the difference in arm posture between the case where the processing is performed and the case where the position is measured by providing a handle capable of being grasped in the same direction. Further, a plurality of handles of the first position measurement sensor 2 may be provided at different positions of the same direction depending on the tool in order to perform measurement in a posture close to that of the arm at the time of using the tool.

In the description given above, it is assumed that the hand 3c can grasp the first position measurement sensor 2 at the same grasp position for each grasp, and deviation of the grasp position is not considered. However, in actuality, the grasp position of the first position measurement sensor 2 by the hand 3c may deviate a little for each grasp. Thus, the processing system 200 in this embodiment includes the position reference instrument 9 fixed at a predetermined position, and the compensation unit 23a of the robot control device 1 causes the first position measurement sensor 2 to measure the position of the position reference instrument 9 before measuring the position of the device with the hand 3c grasping the first position measurement sensor 2, to compensate for deviation of the position at which the first position measurement sensor 2 is grasped.

The compensation unit 23a causes the first position measurement sensor 2 grasped by the hand 3c to measure the position of the position reference instrument 9, and compares a measurement result for the position reference instrument S with a fixed position of the position reference instrument 9 stored in advance. Then, the measurement value of the first position measurement sensor 2 is increased or decreased so as to compensate for deviation of the grasp position depending on the comparison result, to thereby compensate for the measurement value.

The processing system 200 according to this embodiment includes the position reference instrument 9 as an independent member, but other instruments may be used as the position reference instrument. For example, the pipette rack 10 may be used as the position reference instrument, or the rack of the first position measurement sensor 2 may be used as the position reference instrument. With this, it is possible to decrease the number of members installed on the workbench.

With the compensation unit 23a in this embodiment, deviation of the grasp position of the first position measurement sensor 2 is compensated for, and even when the grasp position deviates a little for each grasp, the position of the device is measured accurately. Therefore, it is possible to accurately measure the grasp position of the first position measurement sensor 2 without accurate control thereof, and position the tool accurately.

The robot 3 in this embodiment includes the second position measurement sensor 4 included in the first arm 3a. The robot, control device 1 causes the robot 3 to perform processing of the processing target using the device based on the position of one of the device and processing target measured by the second position measurement sensor 4. The first position measurement sensor 2 and the second position measurement sensor 4 may be the same as the sensor. The robot control device 1 causes the robot 3 to perform measurement of the position of the device using the first position measurement sensor 2 and calibrates the coordinate system prior to the processing or requesting accurate control of the arm. Meanwhile, when the position of a measurement target for which a relatively large amount of positional deviation is predicted for each processing is measured, such as when the micro tube 6 is stored into the centrifuge 12 or when the position of the processing target stored in the microtube 6 is measured, the robot control device 1 causes the robot 3 to perform measurement of the position using the second position measurement sensor 4.

With the robot control device 1 in this embodiment, it is possible to reduce the total amount of time required for processing by omitting, for example, the grasp action of the first position measurement sensor 2 compared to the case of the first position measurement sensor 2 uniformly measuring the position of the measurement target. Further, it is possible to use position measurement sensors appropriately depending on the processing, to thereby improve the accuracy of work and shorten the processing time at the same time.

Figure 7:
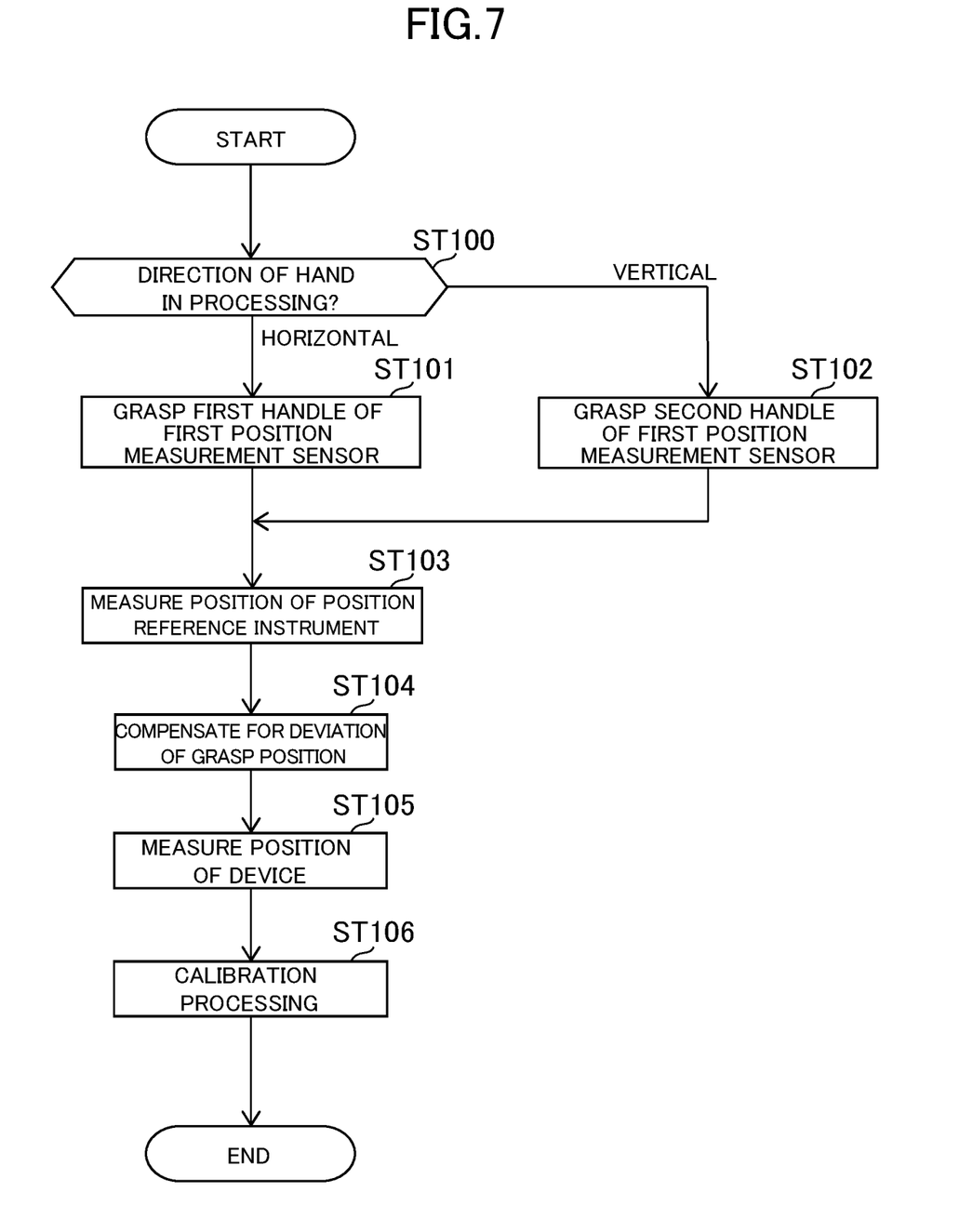
FIG. 7 is a flowchart for illustrating a method of controlling the robot according to the embodiment of the present invention.

FIG. 7 is a flowchart for illustrating a method of controlling a robot, which is performed by the robot control device 1, according to the embodiment of the present invention. First, the selection unit 23b of the position measurement unit 23 determines the direction of the hand 3c in the processing of the processing target using the device (ST100), and branches off to processing of selecting a handle appropriate for the direction. In the processing, when the hand 3c is horizontal, the selection unit 23b selects to grasp the first handle 2a of the first position measurement sensor 2, and the robot 3 grasps the first handle 2a by the hand 3c (ST101). On the contrary, when the hand 3c is not horizontal in the processing, the selection unit 23b selects to grasp the second handle 2b of the first position measurement sensor 2, and the robot 3 grasps the second handle 2b by the hand 3c (ST102). When the first position measurement sensor 2 includes a plurality of handles in the same direction, a handle to be grasped may be selected depending on a tool to be used at the time of processing.

Next, the compensation unit 23b measures the position of the position reference instrument 9 with the first position measurement sensor 2 grasped by the hand 3c (ST103). Then, the compensation unit 23b compares the measured position of the position reference instrument 9 with a predetermined position at which the position reference instrument 9 is fixed, to thereby compensate for deviation of the grasp position (ST104).

After that, the position measurement unit 23 moves the first position measurement sensor 2 grasped by the hand 3c with the first arm 3a, and the robot 3 measures the position of a device to be used at the time of processing of the processing target (ST105). The device coordinate system $S_D$ is configured based on the measured position of the device. Then, the robot control device 1 performs calibration processing for calibrating the relationship between the device coordinate system $S_D$ and the robot coordinate system $S_R$ (ST106).

With the method of controlling a robot according to this embodiment, the first position measurement sensor 2 can measure the position of the device in a posture close to that of the arm in a case of causing the arm to perform processing by grasping a tool, for example, the pipette 7, and deviation of a point to be approached by the hand 3c, which is caused by influences of, for example, a backlash of gears constructing each joint of the arm or bending of the arm, is prevented. Therefore, it is possible to accurately position a tool grasped by the hand 3c when the hand 3c is caused to grasp the tool for some work.

Each of the configurations in the embodiment above is described as a specific example, and the invention disclosed in the present application is not intended to be limited to those specific configurations themselves. A person skilled in the art may make various modifications to the disclosed embodiments, for example, adding or changing a function or an operation method, and the control illustrated in the flowcharts may be replaced by other forms of control that have an equivalent function. It is to be understood that the technical scope of the invention disclosed in the present application covers such modifications as well.

It should be understood by those skilled in the art that various modifications, combinations, sub-combinations and alterations may occur depending on design requirements and other factors as they are within the scope of the appended claims or the equivalents thereof.

What is claimed is:

1. A processing system, comprising:
a robot including at least one arm, each arm including a hand at an end of the at least one arm;
a first position measurement sensor, which is to be grasped by the hand and moved by the at least one arm, and is configured to measure a position of a device to be used when the robot processes a target; and
a robot control device configured to:
cause the hand to grasp the first position measurement sensor; and
cause the first position measurement sensor to measure the position of the device,
the processing system further comprising a position reference instrument, which is fixed at a predetermined position,
wherein the robot control device is configured to compensate for deviation of a position at which the first position measurement sensor is grasped, by causing the first position measurement sensor to measure a position of the position reference instrument before measuring the position of the device with the hand grasping the first position measurement sensor.

2. The processing system according to claim 1, wherein the first position measurement sensor includes a laser sensor, and
wherein the robot control device is configured to cause the hand to grasp the laser sensor so that a central axis of a tool and an optical axis of laser light of the laser sensor overlap with each other, said tool configured to be used for processing of the target when the tool is grasped by the hand.

3. The processing system according to claim 1, wherein, when the robot control device causes the first position measurement sensor to measure the position of the device, the robot control device causes the hand to grasp the first position measurement sensor so that a direction crossing a longitudinal direction of the hand falls within a measurement range of the first position measurement sensor.

4. The processing system according to claim 1, further comprising a second position measurement sensor, which is included in the robot, wherein the robot control device is configured to cause the robot to perform processing of the target using the device, based on the position of one of the device and the processing target measured by the second position measurement sensor.

5. A processing system, comprising:
a robot including at least one arm, each arm including a hand at an end of the at least one arm;
a first position measurement sensor, which is to be grasped by the hand and moved by the at least one arm, and is configured to measure a position of a device to be used when the robot processes a target; and
a robot control device configured to:
cause the hand to grasp the first position measurement sensor; and
cause the first position measurement sensor to measure the position of the device;
wherein the first position measurement sensor includes a plurality of handles to be grasped by the hand, and
wherein the robot control device is configured to select one of the plurality of handles of the first position measurement sensor to be grasped, depending on processing of the target using the device.

6. The processing system according to claim 5,
wherein the plurality of handles are provided so as to extend in different directions, and
wherein the robot control device is configured to set an angle of the hand to an angle corresponding to one of the directions in which the plurality of handles are provided, and is further configured to cause the hand to grasp any one of the plurality of handles.

7. The processing system according to claim 5,
wherein the first position measurement sensor includes a laser sensor, and
wherein the robot control device is configured to cause the hand to grasp the laser sensor so that a central axis of a tool and an optical axis of laser light of the laser sensor overlap with each other, said tool configured to be used for processing of the target when the tool is grasped by the hand.

8. The processing system according to claim 5, wherein, when the robot control device causes the first position measurement sensor to measure the position of the device, the robot control device causes the hand to grasp the first position measurement sensor so that a direction crossing a longitudinal direction of the hand falls within a measurement range of the first position measurement sensor.

9. A method of controlling a robot, the method comprising:
grasping a measurement sensor by a hand, the hand being attached to an arm of a robot;
moving the measurement sensor grasped by the hand with the arm; and
measuring a position of a device to be used when the robot processes a target;
the method further comprising compensating for deviation of a position at which a first position measurement sensor is grasped, by causing the first position measurement sensor to measure a position of a position reference instrument before measuring the position of the device with the hand grasping the first position measurement sensor.

10. A processing system, comprising: a robot including an arm with a hand at an end of the arm; a first position measurement means for measuring a position of a device to be used when the robot processes a target, the first position measurement means configured to be grasped by the hand and moved by the arm; and a robot control means for causing the hand to grasp the first position measurement means and for causing the first position measurement means to measure the position of the devices the processing system further comprising a position reference instrument, which is fixed at a predetermined position, wherein the robot control means k configured to compensate for deviation of a position at which the first position measurement means is grasped, by causing the first position measurement means to measure a position of the position reference instrument before measuring the position of the device with the hand grasping the first position measurement means.

\* \* \* \* \*